United States Patent [19]

Sjöholm et al.

[11] 4,012,275
[45] Mar. 15, 1977

[54] APPARATUS FOR MAKING PLASTIC GLOVES

[75] Inventors: Sören Sjöholm; Einar Andersson, both of Lesjofors, Sweden

[73] Assignee: Parena Plast AB, Lesjofors, Sweden

[22] Filed: Jan. 20, 1976

[21] Appl. No.: 650,609

[30] Foreign Application Priority Data

Feb. 4, 1975 Sweden .............................. 7501199

[52] U.S. Cl. ..................................... 156/515; 83/100
[51] Int. Cl.² ...................... B32B 31/00; B26D 7/06
[58] Field of Search ................. 156/515, 251, 285; 83/100

[56] References Cited
UNITED STATES PATENTS

| 3,234,594 | 2/1966 | Winstead | 156/515 |
| 3,717,538 | 2/1973 | Hartung | 156/251 |

*Primary Examiner*—Douglas J. Drummond
*Attorney, Agent, or Firm*—Larson, Taylor and Hinds

[57] ABSTRACT

An apparatus for making thin protective gloves from a double thermoplastic film web comprises a belt conveyor intermittently moving the film web over a flat bed. Two tool assemblies, each having four identical cutting and welding tools on an intermittently rotatable vertical shaft, are disposed at opposite sides of the conveyor. Each tool has a heated die formed to the shape of the gloves and a suction plate disposed within the die. The tools of the tool assemblies are successively pressed against the web portion on the flat bed during the rest periods of the conveyor. The suction plates lift the gloves parted from the web and transfer them to a delivery station on rotation of the shafts.

8 Claims, 5 Drawing Figures

U.S. Patent  Mar. 15, 1977  Sheet 1 of 2  4,012,275
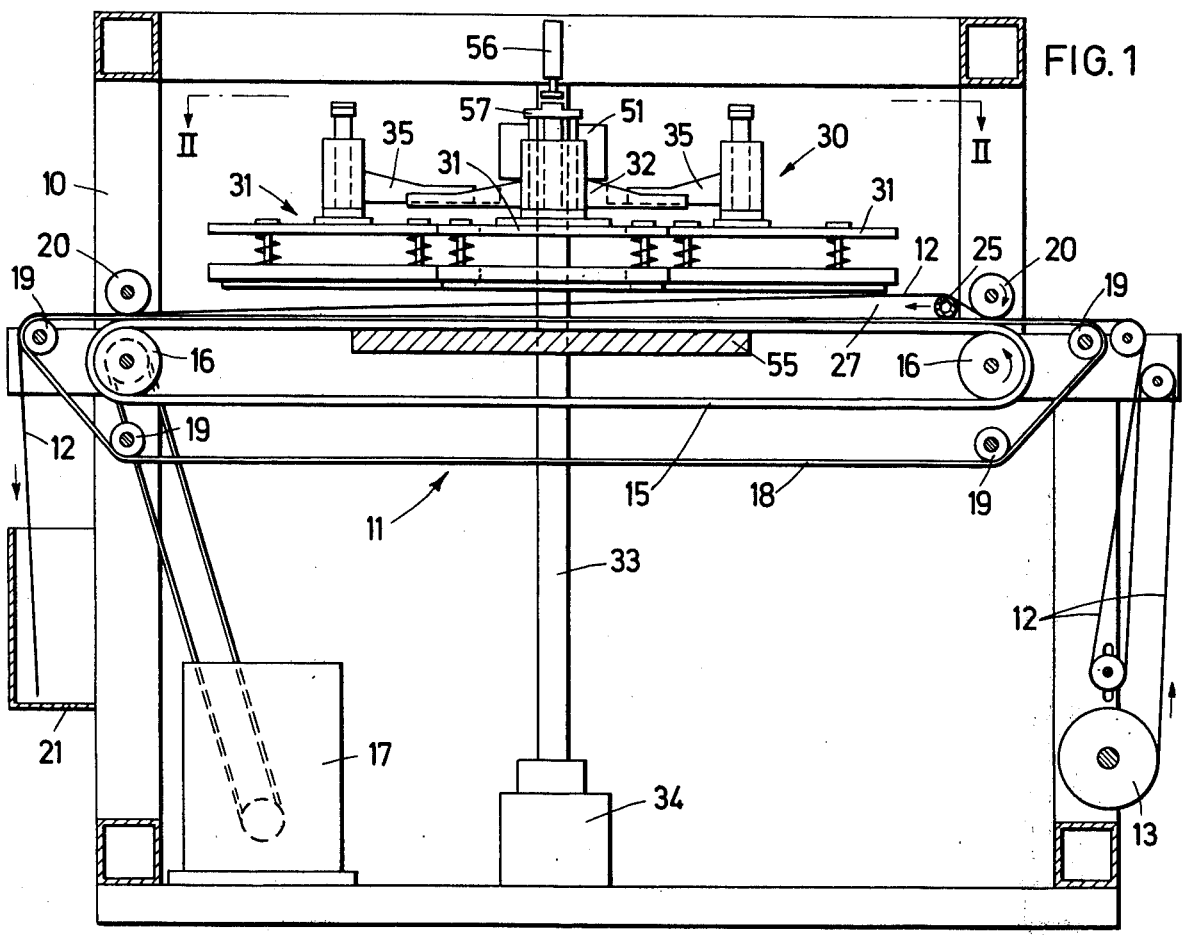
FIG. 1
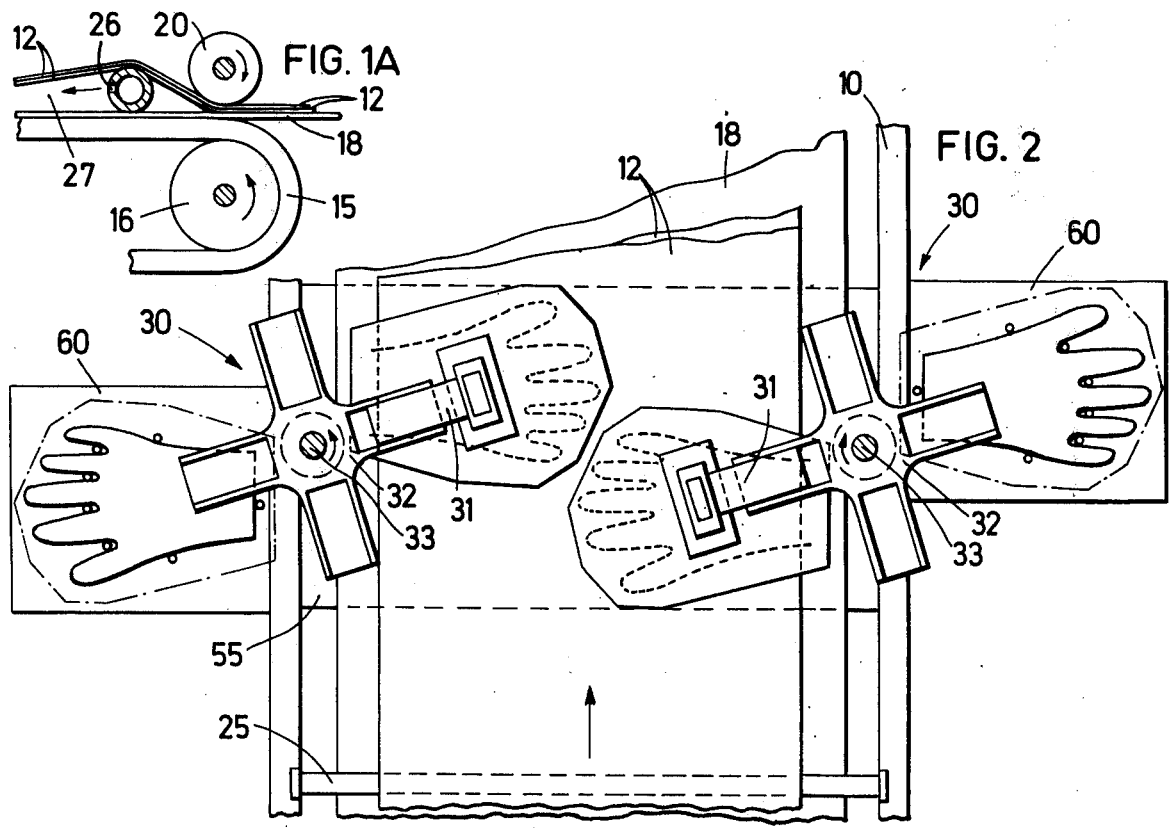
FIG. 1A
FIG. 2

APPARATUS FOR MAKING PLASTIC GLOVES

BACKGROUND OF THE INVENTION

This invention relates to apparatus for making thin protective gloves by simultaneous cutting and welding of a double thermoplastic film web along a hand outline.

A known apparatus for making protective plastic gloves in this manner comprises a conveyor mechanism intermittently moving the double film web along a horizontal path over a flat supporting bed through a cutting and welding station incuding a cutting and welding tool which is vertically movable and adapted to be pressed against the web and the supporting bed during the rest periods of the conveyor. The tool includes a heated die formed to the outline of the glove to be made, and when the die is pressed against the supporting bed and the film web, the glove formed by the welding or fusing together of the two films is directly parted from the surrounding film areas. Thus, the heat of the die both joins the films by fusing them together along the glove outline and cuts through the films along the weld or seam. A transfer member formed by a suction plate or box then is engaged with the glove, lifts it from the bed and moves it to a delivery station where the glove is released from the transfer member which subsequently returns to the cutting and welding station. In the meantime, the conveyor mechanism advances the film web so that a new glove can be made and transferred to the delivery station in the just-described manner.

In order that the cutting and welding operation may be accomplished in a satisfactory manner, the surface supporting the web at the cutting and welding station (this surface usually is formed by a layer of polytetrafluoroethylene, e.g. Teflon) has to be smooth. However, a smooth supporting surface makes the lifting of the glove difficult, since the thin and flimsy film material often has a tendency to adhere to the smooth surface.

Another disadvantage of the known apparatus is that it has poor production capacity and utilizes the film material poorly; a large proportion of the total area of the film web is not utilized but becomes scrap.

SUMMARY OF THE INVENTION

In accordance with the present invention there is provided apparatus for making a glove from a double thermoplastic film web, comprising a conveyor mechanism for intermittently advancing a double thermoplastic film web along a feed path through a cutting and welding station, said conveyor mechanism including an endless conveyor belt and means for maintaining the film web in constant engagement with the conveyor belt at two locations along the feed path on opposite sides of the cutting and welding station; a flat web-supporting bed disposed at the cutting and welding station below the feed path; a cutting and welding tool disposed at the cutting and welding station above the feed path and the web-supporting bed and having a vertically movable, heated die formed to the shape of the glove to be made and a mechanism for lowering the die into contact with the film web and for raising the die clear of the film web after the web has been cut and welded by the die; the conveyor mechanism including spacing means for keeping the film web spaced above the conveyor belt at the cutting and welding station when the die is raised clear from the film web; and a transfer mechanism including a suction member engageable with the film web at the cutting and welding station to grip a glove parted from the film web and movable in synchronism with the conveyor belt to a delivery station to deliver the gripped glove.

An examplary embodiment of the invention is described hereinafter with reference to the accompanying diagrammatic drawings. In the interest of clarity some elements, which are not believed to be essential to the understanding of the invention, are omitted or shown but schematically.

FIG. 1 is a side elevational view, partially in vertical section, of an apparatus embodying the principles of the invention used for the making of protective gloves from thin thermoplastic films;

FIG. 1A is an enlarged fragmentary view of a portion of FIG. 1;

FIG. 2 is a view of the apparatus from the line II—II of FIG. 1;

Figure 3:
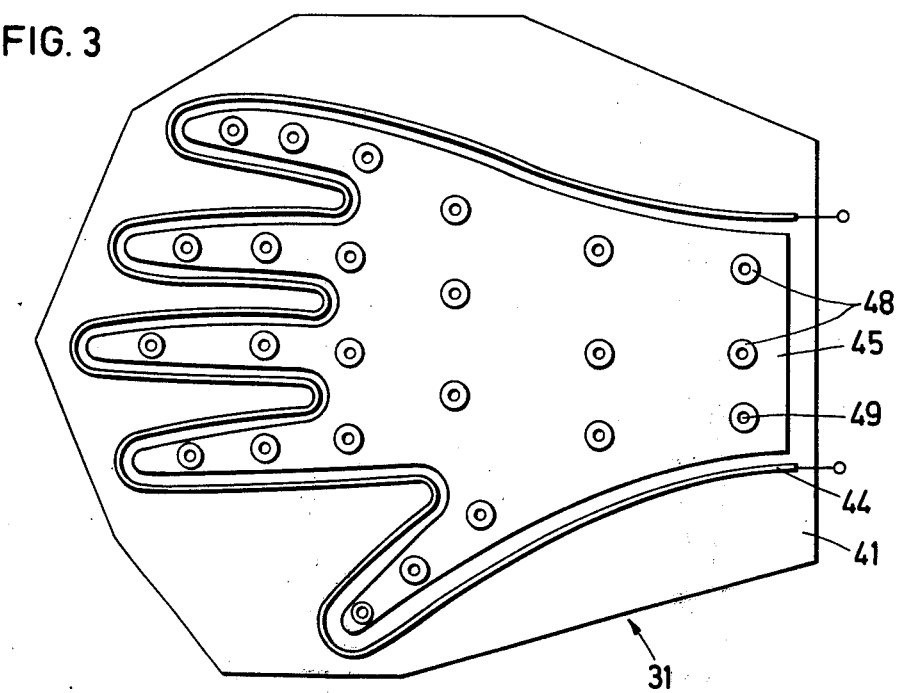
FIG. 3 is a bottom view of one of the cutting and welding tools of the apparatus.

The illustrated apparatus has a frame 10 with a horizontal belt conveyor 11 serving to support and to intermittently advance along a generally horizontal feed path a pair of continuous doubled thermoplastic films 12 (illustrated by a single line in FIG. 1) from which the gloves are to be made. These films, which have a thickness of the order of 0.02 mm, are wound together on one supply roll 13 from which they are pulled off substantially continuously in known manner by the belt conveyor 11 over a vertically movable jockey roller 14. The films 12 are of equal widths and their edges are vertically aligned so that the films cover each other. However, the film edges may also be slightly offset laterally.

The belt conveyor 11 includes an endless belt 15 running over a pair of horizontal rollers 16 at opposite ends of the frame 10. One of the rollers 16 is driven intermittently by a motor 17. Over the inner belt 15, and in non-slip engagement therewith throughout the upper run thereof, is disposed a likewise endless outer belt 18, which is of substantially the same width as, but slightly longer than, the inner belt and which runs over a number of idler rollers 19. One of these rollers may form part of a tensioning device, not shown. The outer belt 18 has a smooth outer surface and consists of or is coated with a plastic material suited for use as a welding bed, e.g. polytetrafluoroethylene of the brand commercially available under the name of Teflon.

The belt conveyor 11 also includes a pair of idling pinch rollers 20 coacting with the rollers 16 and pressing the outer belt 18 against the inner belt 15. The double web formed by the two films 12 runs between the outer belt 18 and the rollers 20, and because the belts and the web are pressed together, the web is advanced without slip occurring between the web and the outer belt or between the inner belt. The scrap web emerging from the conveyor is accumulated in a waste container 21.

At the top side of the outer belt 18 the frame 10 supports adjacent the entry end of the conveyor 11 a spacer element in the form of a metal tube 25 extending horizontally across the conveyor. The film web runs over this tube in sliding engagement with the top portion of it and is thus kept spaced above the top side of the outer belt 18. The distance between the web and the outer belt diminishes gradually towards the discharge end of the conveyor 11. The reduction of the distance of course is somewhat irregular, since the tensioning action produced by the jockey roller 14 is not sufficient to maintain the web in a perfectly flat condition. However, it is important that there is at least a small gap between the web and the outer belt halfway between the ends of the conveyor, that is, at the location where the cutting and welding of the film web take place as described in greater detail hereinafter.

The tube 25 has a number of nozzle openings 26 distributed over the entire width of the outer belt 18. Through these openings jets of air directed into the gap 27 between the film web and the outer belt toward the discharge end of the conveyor 11 so as to further ensure that the web is kept spaced above the outer belt. The air is supplied to the tube through a hose not shown.

Between the entry end and the discharge end of the belt conveyor 11 the path along which the film web is advanced passes through a cutting and welding station 20 having two substantially identical and synchronously operating cutting and welding assemblies 30 disposed in opposing relation at either side of the conveyor 11. Each such assembly 30 has four identical cutting and welding tools 31 supported by a respective one of orthogonally disposed arms of a cruciform rotor 32; in the interest of clarity only a few tools are shown. The two rotors 32 are mounted on respective ones of a pair of vertical shafts 33 and are synchronously rotatable thereon in an intermittent manner in steps of 90°.

As shown in FIG. 2, in which the rotors are illustrated in a rest position, namely a position in which the cutting and welding operation is carried out, the arms of one rotor 32 are parallel with, but laterally offset from, the corresponding arms of the outer rotor 32. The drive means 34 for the shafts 33 and the rotors 32 operate in synchronism with the drive means of the belt conveyor 11 so that the rest periods of the rotors wholly or partially coincide with the rest periods of the belt conveyor.

The detailed construction of the tools 31 is apparent from FIGS. 3 and 4 which show one of the tools 31, respectively from below and in vertical section.

Figure 4:
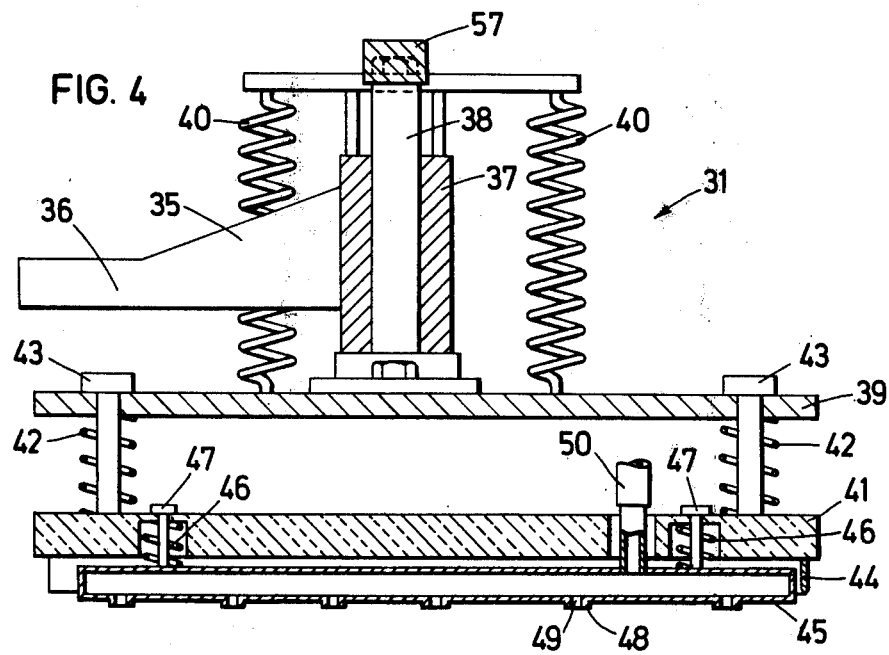
FIG. 4 is a vertical sectional view of the tool of FIG. 3.

The tool 31 has a support 35 with a shank member 36 adapted to be secured in a radially adjustable position in the rotor arms and provided at one end with a vertical sleeve 37, in which two parallel posts 38 (only one is shown in FIG. 4) are vertically displaceable. The lower ends of the posts 38 are securely fastened to a horizontal mounting plate 39. A pair of tension springs 40 constantly urge the columns and the mounting plate upwardly. Below the mounting plate 39 and parallel therewith there is a die plate 41 which is movable relative to the mounting plate and constantly urged away from it by compression springs 42. The die plate 41, which is made from an electrically and thermally insulating material, is guided relative to the mounting plate 39 by bolts 43 also serving to limit the movement away from the mounting plate 39.

A cutting and welding die 44 made from a metal strip and bent to the shape of a hand, see FIG. 3, is secured edgewise to the underside of the die plate 41. The ends of the die strip 44 are provided with electrical connectors, not shown, for electrical heating means.

A shallow flat suction box 45, the outer edge outline of which closely follows the inner side of the die strip, is mounted below the die plate 41. The suction box 45 is movable toward and away from the plate 41 and urged away from it by compression springs 46. Bolts 47 guide the suction box relative to the plate 41 and limit its downward movement. When the suction box is in its lowermost position as shown in FIG. 4, it projects slightly from the lower edge of the die strip 44, and its freedom of upward movement relative to the die plate 41 is sufficient to ensure that the suction box will not prevent pressing the die strip 44 against the underlying web support. On its bottom surface the suction box 45 has a large number of suction bosses 48 with through openings 49 which are in open communication with the interior of the suction box. Suction, and positive pressure, if desired, may be applied to the interior of the suction box through a hose 50 by way of an air distributor 51 mounted on the associated rotor 32 (see FIG. 1).

Directly below the horizontal upper run of the inner belt 15 of the conveyor 11 the cutting and welding station has a horizontal flat plate 55 serving as a stationary supporting bed for the inner belt 15, the outer belt 18 and the film web on the outer belt when the tool 31 is pressed against the web during the cutting and welding operation. The pressing of the tool against the web is accomplished by means of a fluid pressure cylinder 56 (indicated in FIG. 1) secured to the frame 10 and disposed directly above the tool 31 when the latter is at the cutting and welding position above the bed plate 55. The piston of the cylinder depresses a crosspiece 57 interconnecting the posts 38 of the tool.

At the cutting and welding station a delivery table 60 is provided at either side of the belt conveyor 11 (FIG. 2). On this table the completed gloves are stacked by means of the tools 31.

The operation of the apparatus is as follows. After the film web has been inserted between the pinch rollers 20 and the outer conveyor belt 18 of the belt conveyor 11, the latter is started to advance the web step by step. During the rest periods of the conveyor the two tools 31 which are for the moment disposed above the web and the bed plate 55 are depressed by the cylinders 56 until the die strip 44 and the suction box 45 of these tools press the web against the outer conveyor belt 18. The heated die strip 44 of each tool then welds or heat seals the films of the web together along the hand outline, which extends into the adjacent lateral edge of the web at two locations in the wrist portion as shown in FIG. 2. Simultaneously with the welding, the hand-shaped web piece defined by the outline is parted from the film web along the heat seal formed by the die.

After the cutting and welding operation the tools are allowed to retract upwardly. The completed gloves are held to the suction boxes 45 because of the reduced pressure therein and thus are lifted from the top surface of the outer belt 18.

The web is then advanced a distance slightly larger than the maximum width of the glove in the direction of feed, and at the same time the two rotors 32 with the tools 31 are rotated a quarter of a full revolution in opposite directions, so that the two succeeding tools are brought to the cutting and welding position, whereupon the just-described cutting and welding operation is repeated and the web is again advanced and the rotors and the tools are again rotated one step. The two tools which effected the first-mentioned cutting and welding operation then are in a position above the delivery tables 60 where they deliver the completed gloves when the reduced pressure in their suction boxes 45 is removed and, if necessary, replaced by a positive pressure.

The troublesome tendency of the completed gloves to stick to the cutting and welding bed which exists in known glove-making apparatus is hardly at all present in the above-described apparatus. No undisputable explanation why this is so can be given, but it is believed that the gap 27 between the film web and the outer conveyor belt 18 causes a thin cushion of air to be trapped under the glove during the cutting and welding operation so that a direct contact between the glove and the cutting and welding bed is prevented.

Other advantages of the described apparatus are apparent from FIG. 2. For example, since the line along which the cutting and welding takes place is allowed to extend into the edge of the two separate films 12 at two locations, the wrist opening is formed automatically and without additional waste of material. The illustrated angular offsetting of the two tool assemblies 30 permits a further reduction of the waste. Moreover, the apparatus is capable of performing the production at a high rate, firstly because two gloves are produced each time the web is advanced, secondly because the advancing can take place at high rate, since the completed glove need not be delivered before the making of the next glove has been initiated.

The apparatus is not useful solely for the above-described production of gloves but may be used in other cases where it is desired to cut from a continuous thermoplastic film more or less irregularly shaped pieces against a smooth bed and then lift these pieces from the bed to transfer them to a delivery location.

What is claimed is:

1. Apparatus for making a glove from a double thermoplastic film web, comprising a conveyor mechanism for intermittently advancing a double thermoplastic film web along a feed path through a cutting and welding station, said conveyor mechanism including an endless conveyor belt and means for maintaining the film web in constant engagement with the conveyor belt at two locations along the feed path on opposite sides of the cutting and welding station; a flat web-supporting bed disposed at the cutting and welding station below the feed path; a cutting and welding tool disposed at the cutting and welding station at a level above the feed path and the web-supporting bed and having a vertically movable, heated die formed to the shape of the glove to be made and a mechanism for lowering the die into contact with the film web and for raising the die clear of the film web after the web has been cut and welded by the die; said conveyor mechanism including spacing means for keeping the film web spaced above the conveyor belt at the cutting and welding station when the die is raised clear from the film web; and a transfer mechanism including a suction member engageable with the film web at the cutting and welding station to grip a glove parted from the film web and movable in synchronism with the conveyor belt to a delivery station to deliver the gripped glove.

2. Apparatus according to claim 1 in which the spacing means includes a rod extending transversely across the top surface of the conveyor belt, the upper portion of the rod defining a portion of the feed path of the film web.

3. Apparatus according to claim 1 in which the spacing means includes means for introducing a flow of air between the film web and the conveyor belt at the cutting and welding station.

4. Apparatus according to claim 2 in which the rod includes air nozzle means disposed between the feed path and the conveyor belt and adapted to direct a flow or air towards the welding station.

5. Apparatus according to claim 1 in which the spacing means are disposed rearwardly of the cutting and welding station.

6. Apparatus according to claim 1 in which the suction member is disposed within the glove outline defined by the die and horizontally movable as a unit with the cutting and welding tool.

7. Apparatus according to claim 6 in which the cutting and welding tool and the suction member are rotatable as a unit about a vertical axis between a position above the feed path and the web-supporting bed at the cutting and welding station and a delivery position by the side of the feed path.

8. Apparatus according claim 1 including a plurality of additional cutting and welding tools similar to the first-mentioned cutting and welding tool and a plurality of additional suction members similar to the first-mentioned suction member, each suction member being associated with one of the tools and disposed within the glove outline defined by the die of that tool, said first-mentioned and additional tools and suction members being arranged in two groups at opposite sides of the feed path, each such group being intermittently rotatable as a unit about a vertical axis about which the tools are uniformly spaced.

* * * * *